United States Patent
Teng et al.

(10) Patent No.: US 8,118,467 B2
(45) Date of Patent: Feb. 21, 2012

(54) LIGHT GUIDE PLATE AND EDGE-LIGHTING TYPE BACKLIGHT MODULE

(75) Inventors: Tun-Chien Teng, Hsinchu (TW); Jyh-Ming Chen, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 376 days.

(21) Appl. No.: 12/510,891

(22) Filed: Jul. 28, 2009

(65) Prior Publication Data
US 2010/0033989 A1 Feb. 11, 2010

(30) Foreign Application Priority Data
Aug. 8, 2008 (TW) .............................. 97130359 A

(51) Int. Cl.
*F21V 7/04* (2006.01)
(52) U.S. Cl. .......................... 362/615; 362/625; 362/619
(58) Field of Classification Search .......... 362/617–620, 362/623–626, 615, 628, 627, 606, 607, 600, 362/97.1–97.4; 385/146; 349/65
See application file for complete search history.

(56) References Cited

U.S. PATENT DOCUMENTS

| | | | | |
|---|---|---|---|---|
| 4,924,356 | A * | 5/1990 | French et al. ................. | 362/607 |
| 5,126,882 | A | 6/1992 | Oe et al. | |
| 5,521,797 | A * | 5/1996 | Kashima et al. ............. | 362/617 |
| 5,617,251 | A * | 4/1997 | Ohta et al. .................... | 359/599 |
| 5,851,062 | A * | 12/1998 | Shinohara et al. ........... | 362/620 |
| 5,999,685 | A | 12/1999 | Goto et al. | |
| 6,414,794 | B1 * | 7/2002 | Rosenthal ..................... | 359/619 |
| 7,156,548 | B2 | 1/2007 | Teng et al. | |
| 7,396,150 | B2 * | 7/2008 | Ogawa et al. ................ | 362/607 |
| 7,628,504 | B2 * | 12/2009 | Glickman ..................... | 362/148 |
| 7,690,820 | B2 * | 4/2010 | Lee et al. ...................... | 362/327 |
| 7,726,865 | B2 * | 6/2010 | Sato et al. ..................... | 362/620 |
| 7,954,983 | B2 * | 6/2011 | Chen et al. .................... | 362/309 |
| 7,967,494 | B2 * | 6/2011 | Chi et al. ...................... | 362/626 |

FOREIGN PATENT DOCUMENTS

| | | |
|---|---|---|
| JP | 9-113730 A | 5/1997 |
| JP | 2005-71883 A | 3/2005 |
| TW | I237717 | 2/2002 |

* cited by examiner

*Primary Examiner* — Bao Q Truong
(74) *Attorney, Agent, or Firm* — Muncy, Geissler, Olds & Lowe, PLLC

(57) ABSTRACT

A light guide plate includes a first surface, a second surface opposite the first surface, a light incident surface, and a plurality of lenticular lenses and microstructure assemblies. The light incident surface is connected with the first surface and the second surface, and light beams enter the light guide plate by the light incident surface. The lenticular lenses are disposed on the first surface. Each of the lenticular lenses is suitable to deflect imaginary light beams that are incident on the first surface in a predetermined direction to form a focus region on the second surface. The microstructure assemblies are disposed on the focus regions for guiding the light beams incident on the focus regions. A plurality of planar regions are formed on the second surface. Each of the planar regions is disposed between two adjacent microstructure assemblies and suitable for totally reflecting the light beams incident thereon.

17 Claims, 4 Drawing Sheets

United States Patent US 8,118,467 B2

LIGHT GUIDE PLATE AND EDGE-LIGHTING TYPE BACKLIGHT MODULE

CROSS REFERENCE TO RELATED APPLICATION

This application claims priority of application No. 097130359 filed in Taiwan R.O.C on Aug. 8, 2008 under 35 U.S.C. §119; the entire contents of which are hereby incorporated by reference.

BACKGROUND OF THE INVENTION

1. Field of the Invention

The invention relates to a light guide plate and an edge-lighting type backlight module.

2. Description of the Related Art

FIG. 1A shows a schematic diagram illustrating a conventional edge-lighting type backlight module 10. Referring to FIG. 1A, the edge-lighting type backlight module 10 includes a back plate 11, a light guide plate 12, a reflective sheet 13, and a light source (not shown). The light guide plate 12, reflective sheet 13 and light source are disposed on the back plate 11, the reflective sheet 13 is adjacent to a bottom surface 122 of the light guide plate 12, and the light source is disposed near a side surface of the light guide plate 12. The light guide plate 12 is a transparent plate. Light beams emitting from the light source are repeatedly totally reflected by a top surface 121 and the bottom surface 122. The bottom surface 122 is provided with multiple V-shaped grooves 123 for guiding most of light beams toward the top surface 121 to obtain high luminance.

Though the backlight module 10 has high luminance, the backlight module 10 also has inferior luminous uniformity since the brightness of partial regions of the light guide plate near the light source is larger than the brightness of partial regions of the light guide plate far from the light source. FIG. 1B shows a schematic diagram illustrating another conventional edge-lighting type backlight module 10'. As shown in FIG. 1B, in the edge-lighting type backlight module 10', the interval between two adjacent V-shaped grooves 123 near a light source (not shown) is set as larger than the interval between two adjacent V-shaped grooves 123 far from the light source to achieve better luminous uniformity. However, such design gives limited improvement on the luminous uniformity and adds considerable complexity to the design and fabrication of a backlight module.

BRIEF SUMMARY OF THE INVENTION

The invention provides a light guide plate and an edge-lighting type backlight module having high luminance and collimated light emission.

According to an embodiment of the invention, a light guide plate includes a first surface, a second surface opposite the first surface, a light incident surface, a plurality of lenticular lenses, and a plurality of microstructure assemblies. The light incident surface is connected with the first surface and the second surface, and light beams enter the light guide plate by the light incident surface. The lenticular lenses are disposed on the first surface, where each of the lenticular lenses is suitable to deflect imaginary light beams that are incident on the first surface in a predetermined direction to form a focus region on the second surface. The microstructure assemblies are disposed on the focus regions on the second surface for guiding the light beams incident on the focus regions out of the light guide plate. A plurality of planar regions are formed on the second surface, each of the planar regions is disposed between two adjacent microstructure assemblies, and each of the planar regions is suitable for totally reflecting the light beams incident thereon.

According to another embodiment of the invention, an edge-lighting type backlight module includes a back plate, a light source, a light guide plate, and a reflective element. The back plate has at least one side surface and a bottom surface connected with the side surface. The light source is disposed on the back plate and adjacent to the side surface. The light guide plate is disposed on the back plate and adjacent to the light source. The light guide plate includes a first surface, a second surface opposite the first surface, a light incident surface, a plurality of lenticular lenses, and a plurality of microstructure assemblies. The light incident surface is connected with the first surface and the second surface, and light beams enter the light guide plate by the light incident surface. The lenticular lenses are disposed on the first surface, and each of the lenticular lenses is suitable to deflect imaginary light beams that are incident on the first surface in a predetermined direction to form a focus region on the second surface. The microstructure assemblies are disposed on the focus regions on the second surface for guiding the light beams incident on the focus regions out of the light guide plate. A plurality of planar regions are formed on the second surface, each of the planar regions is disposed between two adjacent microstructure assemblies, and each of the planar regions is suitable for totally reflecting the light beams incident thereon. The reflective element is disposed between the second surface of the light guide plate and the bottom surface of the back plate to enable the lights beams that leave the light guide plate by the second surface to return to the second surface.

In one embodiment, each of the lenticular lenses has an arc surface and an elongated planar surface, and the elongated planar surface is connected with two opposite ends of the arc surface and formed on the first surface. The elongated planar surface, each of the microstructure assemblies, and each of focus regions substantially stretch in a lengthwise direction and in a crosswise direction.

In one embodiment, the width in the crosswise direction of each of the microstructure assemblies is substantially equal to or smaller than the width in the crosswise direction of the focus region provided with the microstructure assembly.

According to the above embodiments, a portion of the light beams incident on the microstructure assemblies is reflected by the microstructure assemblies toward lenticular lenses, and then deflected by the lenticular lenses to leave the light guide plate in a direction parallel to the normal of the first surface of the light guide plate. Another portion of the light beams incident on the microstructure assemblies passes through the microstructure assemblies and reflected by the reflective element to pass through corresponding microstructure assemblies and then deflected by the lenticular lenses to leave the light guide plate in a direction parallel to the normal of the first surface. Under the circumstance, the brightness of the light guide plate is enhanced and the light beams leaving the light guide plate are collimated to a greater extent. Besides, since the planar region between two adjacent microstructure assemblies is capable of totally reflecting light beams, the light beams incident on the surface between two adjacent microstructure assemblies are totally reflected to be retained in the light guide plate and then guided out of the light guide plate by the lenticular lenses to collimate the light beams out of the light guide plate to a further greater extent.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
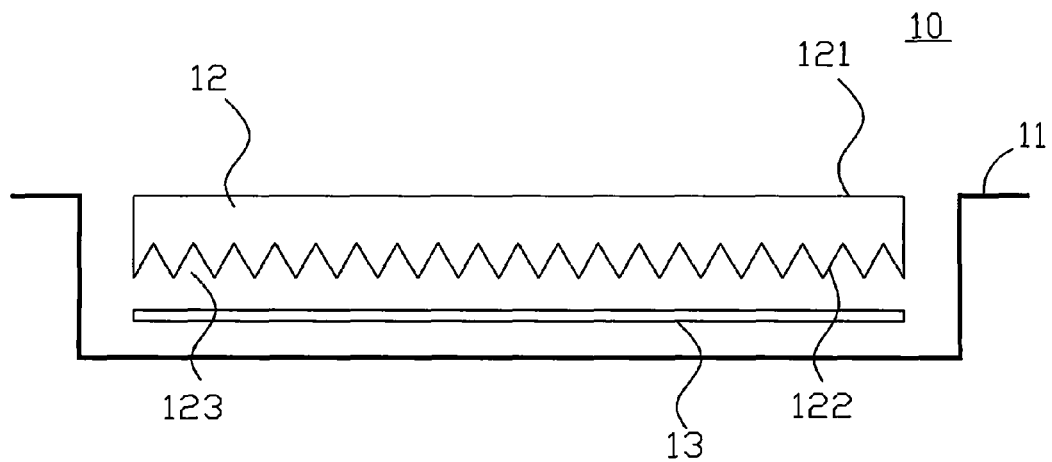
FIG. 1A shows a schematic diagram illustrating a conventional edge-lighting type backlight module.
Figure 1B:
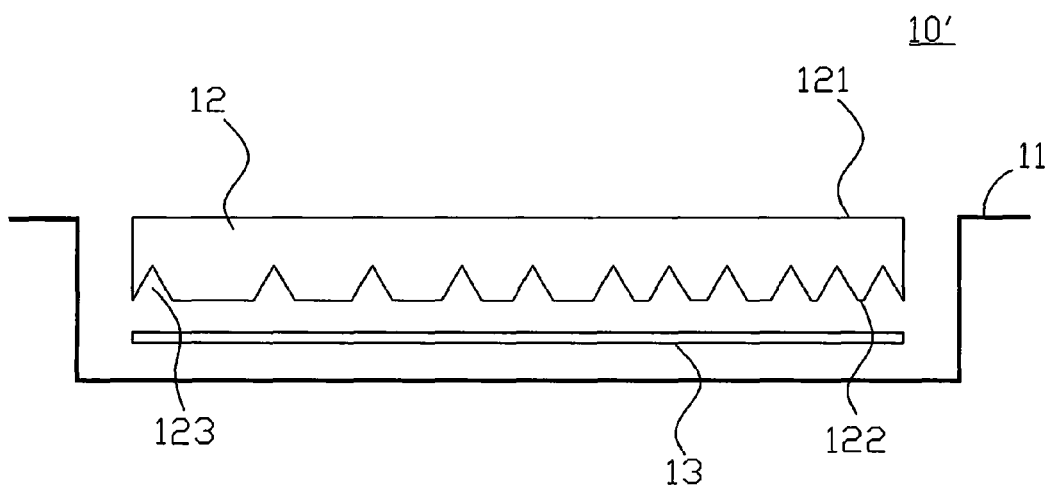
FIG. 1B shows a schematic diagram illustrating another conventional edge-lighting type backlight module.
Figure 2:
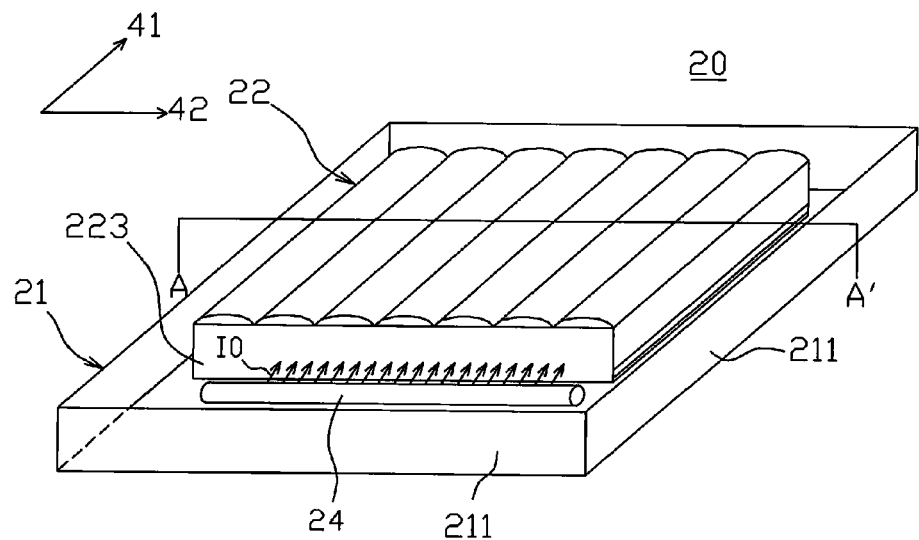
FIG. 2 shows a schematic diagram illustrating an edge-lighting type backlight module according to an embodiment of the invention.
Figure 3:
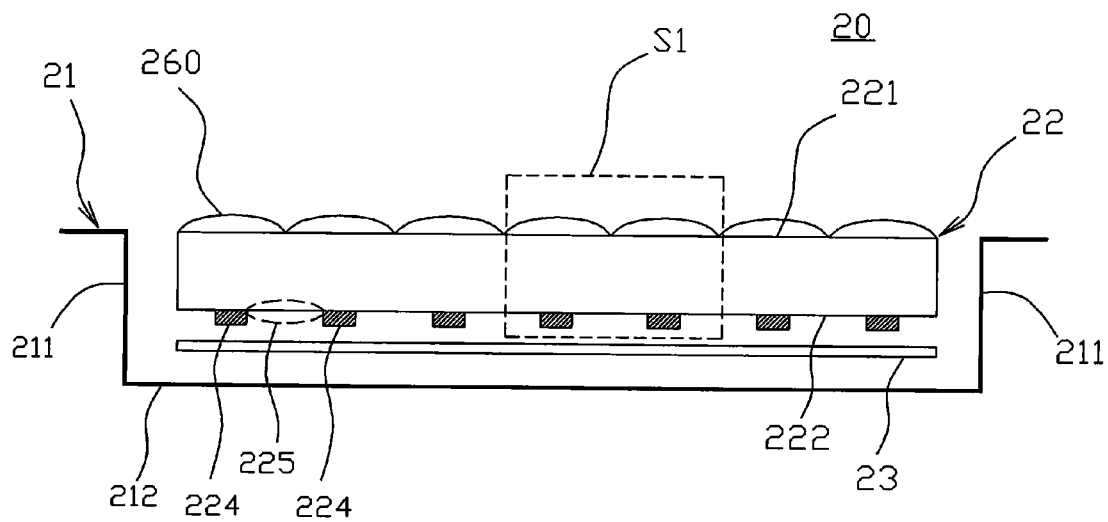
FIG. 3 shows an enlarged cross-section cut along line A-A' in FIG. 2.

FIG. 2 shows a schematic diagram illustrating an edge-lighting type backlight module according to an embodiment of the invention. FIG. 3 shows an enlarged cross-section cut along line A-A' in FIG. 2. Referring to both FIG. 2 and FIG. 3, an edge-lighting type backlight module 20 includes a back plate 21, a light source 24, a light guide plate 22, and a reflective element 23. The back plate 21 has four side surfaces 211 that together form the shape of a rectangle and the back plate 21 has a bottom surface 212 connected with the side surfaces 211. The light source 24 is disposed on the back plate 21 and adjacent to one side surface 211, and the light source 24 emits light beams I0 toward the light guide plate 22. The light guide plate 22 is disposed on the back plate 21 and adjacent to the light source 24. The light guide plate 22 has a first surface 221, a second surface 222, a light incident surface 223, a plurality of microstructure assemblies 224, and a plurality of lenticular lenses 260. The second surface 222 and the first surface 221 are respectively on opposite sides of the light guide plate 22. The light incident surface 223 is connected with the first surface 221 and the second surface 222, and faces a side surface 211 to receive the light beams I0. The lenticular lenses 260 are disposed on the first surface 22 land extend in a direction substantially parallel to the propagation direction of the light beams I0. Further, a plurality of microstructure assemblies 224 are formed on the second surface 222. In this embodiment, each region between two adjacent microstructure assemblies 224 is a planar region 225 for totally reflecting light beams incident thereon. The reflective element 23 may be a planar reflective sheet made of polyethylene terephthalate (PET). The reflective element 23 is disposed between the second surface 222 of the light guide plate 22 and the bottom surface 212 of the back plate 21 to enable the light beams that leave the light guide plate 22 by the second surface 222 to return to the second surface 222 so as to improve light utilization efficiency.

Figure 4:
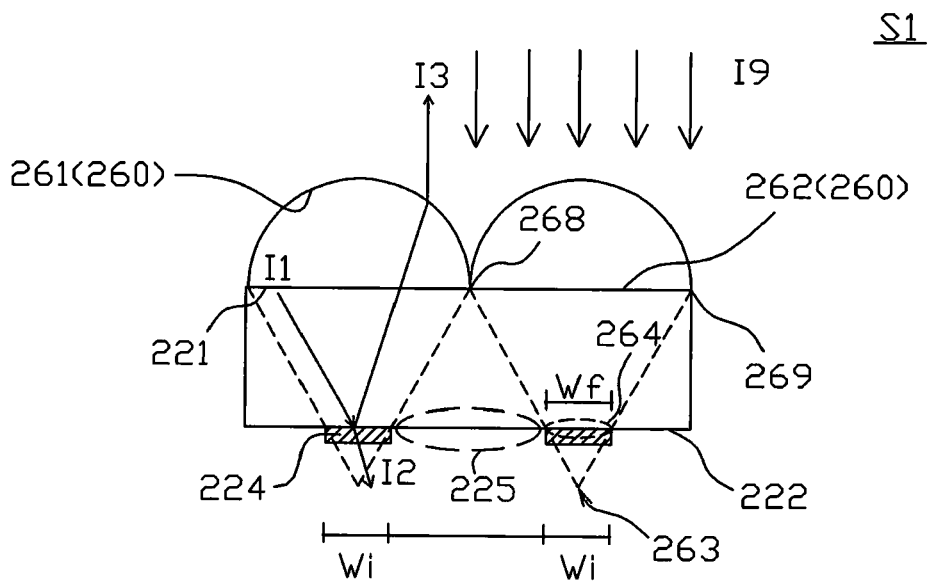
FIG. 4 is an enlarged schematic diagram of a region S1 shown in FIG. 3.

FIG. 4 is an enlarged schematic diagram of a region S1 shown in FIG. 3. Referring to FIG. 4, each of the lenticular lenses 260 on the first surface 221 has an arc surface 261 and an elongated planar surface 262. The elongated planar surface 262 is formed on the first surface 221 of the light guide plate 22 and connected with two opposite ends of the arc surface 261. The elongated planar surface 262 stretches in a lengthwise direction 41 and a crosswise direction 42 (indicated in the three-dimensional diagram of FIG. 2). The lengthwise direction 41 is substantially perpendicular to the crosswise direction 42, and the elongated planar surface 262 is a rectangular surface. The shape of the arc surface 261 is not limited. For example, the arc surface 261 may be a surface of a semi-sphere or a semi-ellipsoid, and thus the lenticular lenses 260 are able to focus imaginary light beams I9 on a focal line 263. The imaginary light beams I9 propagate in a direction parallel to the normal of the first surface 221 toward the first surface 221. In this embodiment, the imaginary light beams I9 are first incident on the second surface 222 to form focus regions 264 thereon and then pass through the second surface 222 to focus on the focal line 263, with the focal line 263 being adjacent to the second surface 222. Hence, each of the lenticular lenses 260 is allowed to form a focus region 264 that extends in the lengthwise direction 41 and the crosswise direction 42 on the second surface 222. In other words, a longitudinal side 268 of the lenticular lens 260 deflects the imaginary light beams I9 to form a first border on the second surface 222, another longitudinal side 269 of the lenticular lens 260 deflects the imaginary light beams I9 to form a second border on the second surface 222, and the focus region 264 is bounded by the first border and the second border. A plurality of microstructure assemblies 224 are correspondingly disposed on the focus regions 264; for example, each focus region 264 is provided with a microstructure assembly 224 as shown in FIG. 4. Note the imaginary light beams I9 are not actual light beams entering the backlight module 20 but merely serve to illustrate the formation of the focus region 264. Also, the light guide plate 22 in this embodiment emits the light beams I0 from the first surface 221 in a direction parallel to the normal of the first surface 221, so the imaginary light beams I9 are set to be incident on the first surface 221 in a direction parallel to the normal of the first surface 221. However, the propagation direction of the imaginary light beams I9 is not limited. For example, in case a backlight module is designed to allow most of the light beams I0 to leave the light guide plate 22 in a first direction, the imaginary light beams I9 are set as the light beams incident on the first surface 221 in a second direction opposite to the first direction, and the microstructure assemblies 224 are disposed on focus regions 264 upon which the imaginary light beams I9 impinge on the second surface 222.

As shown in FIG. 4, on the second surface 222, each planar region 225 and each microstructure assembly 224 substantially extend in the lengthwise direction 41 and the crosswise direction 42, so a portion of the light beams I1 incident on the microstructure assemblies 224 is reflected by the microstructure assemblies 224 toward the lenticular lenses 260 to form light beams I3, and the lights beams I3 are deflected by the lenticular lenses 260 to leave the light guide plate 22 in a direction parallel to the normal of the first surface 221. Further, another portion of the light beams I1 incident on the microstructure assemblies 224 passes through the microstructure assemblies 224 to form light beams I2, and the light beams I2 are reflected by the reflective element 23, return to the light guide plate 22, again pass through the microstructure assemblies 224, and then are deflected by corresponding lenticular lenses 260 to leave the light guide plate 22 in a direction parallel to the normal of the first surface 221. Typically, compared with the light beams transmitted from the focus regions 264 on the second surface 222, the light beams transmitted from the regions outside the focus regions 264 are comparatively difficult to be collimated into the direction parallel to the normal of the first surface 221. In that case, since a planar region 225 capable of totally reflecting the incoming light beams is disposed between two adjacent micro structure assemblies 224 in this embodiment, the light beams incident on the surface between two adjacent microstructure assemblies 224 are totally reflected to be retained in the light guide plate 22 and then guided out of the light guide plate 22 by the lenticular lenses 260. Thus the output light beams of the light guide plate 22 are collimated to a greater extent.

Figure 5:
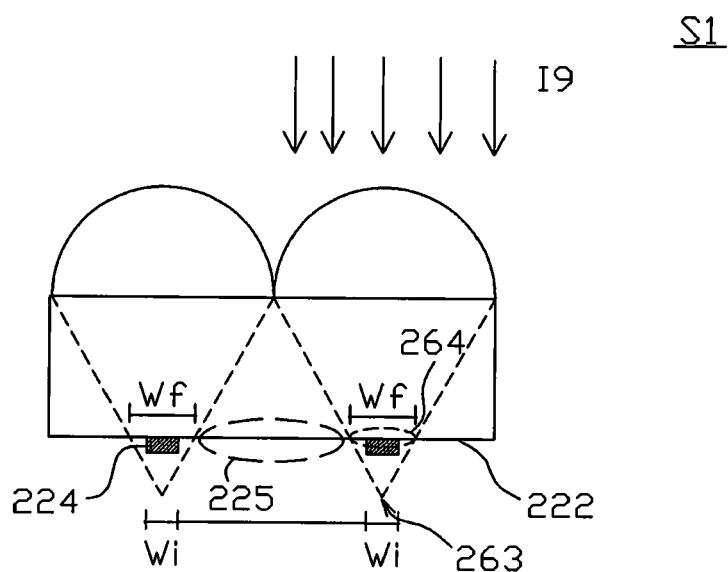
FIG. 5 is another enlarged schematic diagram of a region S1 shown in FIG. 3.

In one embodiment, the width $W_i$ in the crosswise direction 42 of each microstructure assembly 224 is set as substantially equal to (FIG. 4) or smaller than (FIG. 5) the width $W_f$ in the crosswise direction 42 of each focus region 264 for the effect on enhanced light collimation. Further, when the width $W_i$ in the crosswise direction 42 of each microstructure assembly 224 is substantially equal to the width $W_f$ in the crosswise direction 42 of each focus region 264, the focus region 264 is used to the more extent.

Note that each lenticular lens 260 is not limited to extend in a direction parallel to the propagation direction of the light beams I0, as long as the position of each microstructure assembly 224 matches with the arrangement of the lenticular lens 260. In an alternate embodiment, each of the lenticular lenses 260 may be bent to form a wavy shape.

Figure 6:
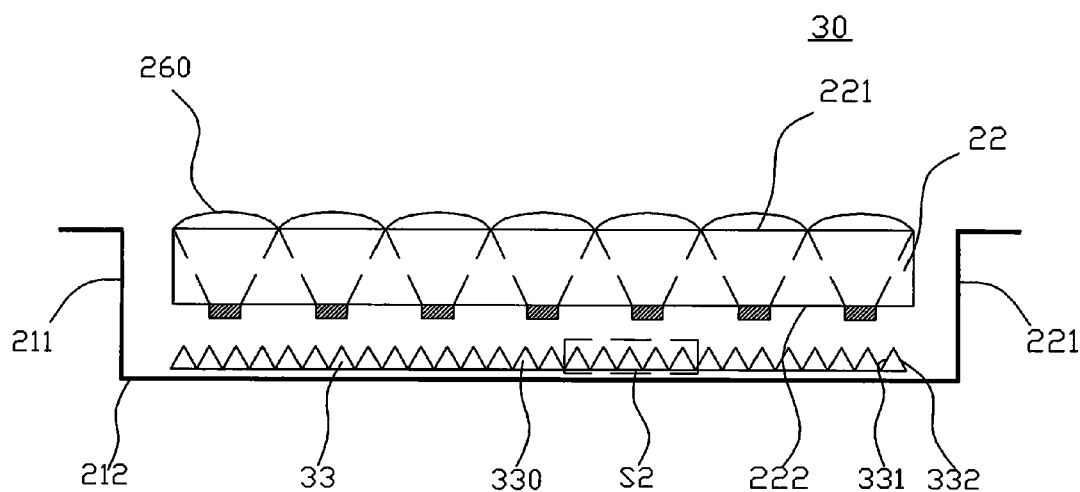
FIG. 6 shows a schematic diagram illustrating an edge-lighting type backlight module according to another embodiment of the invention.

FIG. 6 shows an edge-lighting type backlight module 30 according to another embodiment of the invention. The edge-lighting type backlight module 30 is similar to the edge-lighting type backlight module 20, except that the reflective element 33 is different to the reflective element 23. Hence, the reflective element 33 of the edge-lighting type backlight module 30 is described below in detail. The reflective element 33 includes a plurality of prisms 330 convex to the second surface 222. Each of the prisms 330 extends substantially in the lengthwise direction 41 of the lenticular lens 260 (shown in FIG. 2), and all the prisms 330 are arranged at regular intervals. Further, each prism 330 has a first side surface 331 and a second side surface 332 connected with the first side surface 331, and at least one of the first side surface and the second side surface is a reflective surface for reflecting the light beams that leave the light guide plate 22 by the second surface 222 to return to the second surface 222. Since the prism 330 is convex to the second surface 222, the light beams that leave the second surface 222 and impinge on the prism 330 are deflected by the prism 330 and guided to a direction substantial parallel to the normal of the first surface 221. Then, the deflected light beams pass through the lenticular lenses 260 and leave the light guide plate 22. Hence, compared with the edge-lighting type backlight module 20, the edge-lighting type backlight module 30 collimates the light beams leaving the light guide plate 22 to a greater extent.

Figure 7:
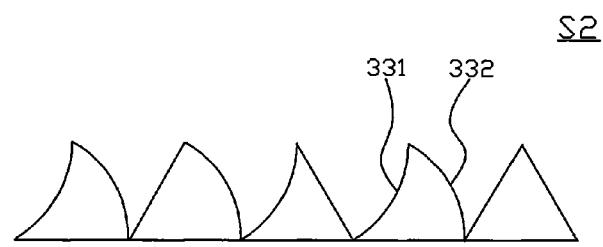
FIG. 7 is an enlarged schematic diagram of a region S2 shown in FIG. 6.

FIG. 7 is an enlarged schematic diagram of a region S2 shown in FIG. 6. Referring to FIG. 7, a first side surface 331 or a second side surface 332 of a prism 330 may be a planar surface, a concave surface or a convex surface. When the first side surface 331 or the second side surface 332 are concave surfaces, the concave surfaces that gather the light beams incident thereon enable the light guide plate 22 to emit more intensive light beams. In comparison, when the first side surface 331 or the second side surface 332 are convex surfaces, the convex surfaces diffuse light beams incident thereon. Hence, since some regional defects may exist on the light guide plate 22 to cause excess light intensity on partial regions of the light guide plate 22, the convex surfaces are able to overcome this problem.

Further, the light source 24 (shown in FIG. 2) may include at least one cold cathode fluorescent lamp (CCFL) or at least one light-emitting diode (LED). Besides, the shape and the construction of the microstructure assemblies 224 are not limited. In one embodiment, the microstructure assemblies 224 are made of ink materials spread on partial regions of the second surface 222, and the ink materials are doped with light-reflecting particles such as $TiO_2$ or PMMA. Alternatively, the microstructure assemblies 224 may be in the shape of a pillar or a rough surface with preferable reworkability.

According to the above embodiments, a portion of the light beams incident on microstructure assemblies is reflected by the microstructure assemblies toward lenticular lenses, and then deflected by the lenticular lenses to leave the light guide plate in a direction parallel to the normal of the first surface of the light guide plate. Further, another portion of the light beams incident on the microstructure assemblies passes through the microstructure assemblies and reflected by the reflective element to pass through corresponding microstructure assemblies, and then deflected by the lenticular lenses to leave the light guide plate in a direction parallel to the normal of the first surface. Under the circumstance, the brightness of the light guide plate is enhanced and the light beams leaving the light guide plate are collimated to a greater extent. Besides, since a planar region that capable of totally reflecting the incoming light beams, the light beams incident on the surface between two adjacent microstructure assemblies are totally reflected to be retained in the light guide plate and then guided out of the light guide plate by the lenticular lenses.

Thus the output light beams of the light guide plate are collimated to a further greater extent.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate, comprising:
    a first surface;
    a second surface opposite the first surface;
    a light incident surface connected with the first surface and the second surface, wherein light beams enter the light guide plate by the light incident surface;
    a plurality of lenticular lenses disposed on the first surface, wherein each of the lenticular lenses is suitable to deflect imaginary light beams incident on the first surface in a predetermined direction to form a focus region on the second surface; and
    a plurality of microstructure assemblies disposed on the focus regions on the second surface for guiding the light beams incident on the focus regions out of the light guide plate;
    wherein a plurality of planar regions are formed on the second surface, each of the planar regions is disposed between two adjacent microstructure assemblies, and each of the planar regions is suitable for totally reflecting the light beams incident thereon.

2. The light guide plate as claimed in claim 1, wherein the microstructure assemblies are made of ink material doped with light-reflecting particles.

3. The light guide plate as claimed in claim 1, wherein each of the lenticular lenses has an arc surface and an elongated planar surface, and the elongated planar surface is connected with two opposite ends of the arc surface and formed on the first surface.

4. The light guide plate as claimed in claim 3, wherein the arc surface is a surface of a semi-sphere or a semi-ellipsoid.

5. The light guide plate as claimed in claim 3, wherein the elongated planar surface stretches in a lengthwise direction and a crosswise direction, and the width in the crosswise direction of each of the microstructure assemblies is substantially equal to the width in the crosswise direction of the focus region provided with the microstructure assembly.

6. The light guide plate as claimed in claim 3, wherein the elongated planar surface stretches in a lengthwise direction and a crosswise direction, and the width in the crosswise direction of each of the microstructure assemblies is smaller than the width in the crosswise direction of the focus region provided with the microstructure assembly.

7. An edge-lighting type backlight module, comprising:
    a back plate having at least one side surface and a bottom surface connected with the side surface;
    a light source disposed on the back plate and adjacent to the side surface, wherein the light source is suitable for emitting light beams;
    a light guide plate disposed on the back plate and adjacent to the light source, the light guide plate comprising:
        a first surface;
        a second surface opposite the first surface;
        a light incident surface connected with the first surface and the second surface, wherein light beams enter the light guide plate by the light incident surface;
        a plurality of lenticular lenses disposed on the first surface, wherein each of the lenticular lenses is suitable to deflect imaginary light beams incident on the first surface in a predetermined direction to form a focus region on the second surface; and
        a plurality of microstructure assemblies disposed on the focus regions on the second surface for guiding the light beams incident on the focus regions out of the light guide plate, wherein a plurality of planar regions are formed on the second surface, each of the planar regions is disposed between two adjacent microstructure assemblies, and each of the planar regions is suitable for totally reflecting the light beams incident thereon; and
    a reflective element disposed between the second surface of the light guide plate and the bottom surface of the back plate to enable the light beams leaving the light guide plate from the second surface to return to the second surface.

8. The edge-lighting type backlight module as claimed in claim 7, wherein the microstructure assemblies are made of ink material doped with light-reflecting particles.

9. The edge-lighting type backlight module as claimed in claim 7, wherein each of the lenticular lenses has an arc surface and an elongated planar surface, and the elongated planar surface is connected with two opposite ends of the arc surface and formed on the first surface.

10. The edge-lighting type backlight module as claimed in claim 9, wherein the arc surface is a surface of a semi-sphere or a semi-ellipsoid.

11. The edge-lighting type backlight module as claimed in claim 9, wherein the elongated planar surface stretches in a lengthwise direction and a crosswise direction, and the width in the crosswise direction of each of the microstructure assemblies is substantially equal to the width in the crosswise direction of the focus region provided with the microstructure assembly.

12. The edge-lighting type backlight module as claimed in claim 9, wherein the elongated planar surface stretches in a lengthwise direction and a crosswise direction, and the width in the crosswise direction of each of the microstructure assemblies is smaller than the width in the crosswise direction of the focus region provided with the microstructure assembly.

13. The edge-lighting type backlight module as claimed in claim 7, wherein the reflective element comprises a plurality of prisms convex to the second surface.

14. The edge-lighting type backlight module as claimed in claim 13, wherein each of the prisms extends substantially in a lengthwise direction of the lenticular lenses.

15. The edge-lighting type backlight module as claimed in claim 13, wherein the prisms are arranged at regular intervals.

16. The edge-lighting type backlight module as claimed in claim 13, wherein the prism has a first side surface and a second side surface connected with the first side surface, and the first side surface or the second side surface is a planar surface, a convex surface or a concave surface.

17. The edge-lighting type backlight module as claimed in claim 7, wherein the light source comprises at least one cold cathode fluorescent lamp or at least one light-emitting diode.

* * * * *